(12) United States Patent
McConney

(10) Patent No.: US 8,458,810 B2
(45) Date of Patent: Jun. 4, 2013

(54) SCANNING THERMAL TWISTING ATOMIC FORCE MICROSCOPY

(76) Inventor: Michael E. McConney, Beavercreek, OH (US)

( * ) Notice: Subject to any disclaimer, the term of this patent is extended or adjusted under 35 U.S.C. 154(b) by 0 days.

(21) Appl. No.: 13/441,480

(22) Filed: Apr. 6, 2012

(65) Prior Publication Data

US 2012/0260374 A1 Oct. 11, 2012

Related U.S. Application Data

(60) Provisional application No. 61/473,026, filed on Apr. 7, 2011.

(51) Int. Cl.
*G01J 3/00* (2006.01)
*G01Q 70/08* (2010.01)

(52) U.S. Cl.
USPC .................................. 850/5; 850/1; 850/33

(58) Field of Classification Search
USPC ............................................. 850/1, 5, 33
See application file for complete search history.

(56) References Cited

U.S. PATENT DOCUMENTS

| | | | |
|---|---|---|---|
| 5,441,343 A | 8/1995 | Pylkki et al. | |
| 5,663,507 A * | 9/1997 | Westervelt et al. | 73/727 |
| 5,719,324 A | 2/1998 | Thundat et al. | |
| 5,737,086 A | 4/1998 | Gerber et al. | |
| 5,804,709 A * | 9/1998 | Bourgoin et al. | 73/105 |
| 5,977,544 A | 11/1999 | Datskos et al. | |
| 6,189,374 B1 * | 2/2001 | Adderton et al. | 73/105 |
| 6,312,959 B1 | 11/2001 | Datskos | |
| 6,668,628 B2 * | 12/2003 | Hantschel et al. | 73/105 |
| 6,734,425 B2 * | 5/2004 | Hantschel et al. | 850/1 |
| 6,788,086 B2 * | 9/2004 | Hantschel et al. | 324/754.26 |
| 7,073,938 B2 * | 7/2006 | Gianchandani et al. | 374/185 |
| 7,448,798 B1 | 11/2008 | Wang | |
| 7,533,561 B2 * | 5/2009 | Beyder et al. | 73/105 |
| 7,665,889 B2 | 2/2010 | Kjoller et al. | |
| 7,691,541 B2 * | 4/2010 | Crocker et al. | 430/5 |
| 7,705,307 B1 | 4/2010 | Zhao et al. | |
| 7,748,260 B2 * | 7/2010 | Su et al. | 73/105 |
| 7,928,343 B2 * | 4/2011 | King et al. | 219/444.1 |
| 8,177,422 B2 * | 5/2012 | Kjoller et al. | 374/16 |
| 8,192,809 B2 * | 6/2012 | Gaitas et al. | 427/580 |
| 8,256,018 B2 * | 8/2012 | Haaheim et al. | 850/33 |

(Continued)

OTHER PUBLICATIONS

A. Majumdar: "Scanning Thermal Microscopy", Annual Review of Materials Science, vol. 29, 1999, pp. 505-585.

(Continued)

*Primary Examiner* — David A Vanore
(74) *Attorney, Agent, or Firm* — Sughrue Mion, PLLC

(57) ABSTRACT

Provided are atomic force microscope probes, methods for making probes for use in atomic force microscopes and systems using such probes. The probes include at least a body portion and a cantilever portion. The cantilever portion may include a first surface and a second surface opposite the first surface. The cantilever portion further includes a first material arranged on the first surface, such that the cantilever portion twists about a center axis of the cantilever portion when the cantilever portion is heated. The first material may be arranged symmetrically or non-symmetrically on a portion of the first surface, or it may be arranged non-uniformly over the first surface. The cantilever portion of the probe may also include a second material arranged on the second surface of the cantilever portion. The first and second materials have a different thermal expansion than the material forming the cantilever portion.

49 Claims, 12 Drawing Sheets

U.S. PATENT DOCUMENTS

| | | | |
|---|---|---|---|
| 2006/0222047 A1* | 10/2006 | Reading | 374/120 |
| 2008/0011065 A1* | 1/2008 | Su et al. | 73/105 |
| 2009/0249521 A1 | 10/2009 | Dazzi et al. | |
| 2011/0041223 A1* | 2/2011 | Jesse et al. | 850/5 |
| 2011/0154546 A1* | 6/2011 | Proksch et al. | 850/1 |
| 2012/0050718 A1* | 3/2012 | Dazzi et al. | 356/51 |
| 2012/0167261 A1* | 6/2012 | Belkin et al. | 850/56 |

OTHER PUBLICATIONS

J. K. Gimzewski et al.: "Observation of a chemical reaction using a micromechanical sensor", Chemical Physics Letters, vol. 217, No. 5,6, Jan. 28, 1994, pp. 589-594.

Melburne C. Lemieux et al.: "Polymeric Nanolayers as Actuators for Ultrasensitive Thermal Bimorphs", Nano Letters, 2006, vol. 6, No. 4, pp. 730-734.

O. Nakabeppu et al.: "Scanning thermal imaging microscopy using composite cantilever probes", Appl. Phys. Lett. 66 (6), Feb. 6, 1995, pp. 694-696.

H M Pollock et al.: "Micro-thermal analysis: techniques and applications", Journal of Physics D: Applied Physics 34 (2001) pp. 23-53.

C.C. Williams et al.: "Scanning Thermal Profiler", Microelectronic Engineering 5 (1986), North Holland, pp. 509-513.

* cited by examiner

SCANNING THERMAL TWISTING ATOMIC FORCE MICROSCOPY

CROSS-REFERENCE TO RELATED APPLICATION

This application claims the benefit of U.S. Provisional Application No. 61/473,026 filed in the U.S. Patent and Trademark Office on Apr. 7, 2011, the disclosure of which is incorporated herein by reference in its entirety.

BACKGROUND

1. Field

Apparatuses and methods consistent with embodiments of the present invention relate to a thermal bimorph probe for use in scanning thermal microscopy, and in particular to a thermal bimorph probe formed so as to twist when heated, thereby isolating the thermal signal from the topographical signal and providing improved thermal and spatial resolution.

2. Description of the Related Art

Scanning thermal microscopy (SThM) is a microscopy technique used in the analysis of thermal, electronic and photonic transport at dimensions approaching the mean free path of phonons and other quasi particles. The scanning thermal microscopy technique uses the atomic force microscope, but includes the additional ability to map thermal properties. An atomic force microscope (AFM) is used for SThM because the microscope maintains a set distance/force to the surface, which is necessary to map thermal properties. Coupling the atomic force microscope with specialized probes has also been used to image other surface properties including electrical properties, magnetic properties and optical properties. The ability to map thermal transport and heat dissipation in nanoscale features is important to the semiconductor industry, photovoltaic industry and other high-end physical material studies.

FIG. 1 illustrates a typical set up for an atomic force microscope 100. The atomic force microscope creates images of surface topography by tracing a probe tip 111 over a sample 140 surface with a constant force. The height of the piezo tube actuator 160 then changes to maintain a constant force between the probe tip 111 and the sample 140. This is used to create the image of the surface of the sample 140. The probe 110 is a disposable part of the atomic force microscope 100 and required to implement any atomic force microscopy or scanning thermal microscopy technique. An unspecialized atomic force microscope probe used for imaging topography is primarily composed of the tip portion 111, a cantilever portion 112 and a body portion or probe chip 113. The tip portion 111 extends from the end of the cantilever portion 112 and ends in a point with a shape often described as hemispherical. Typically tips extend anywhere between 1 to 100 micrometers from the cantilever. The tip radius (or the radius of the hemispherical point) can range from 1 to 100 nm, but are typically between 5 to 20 nm.

In the atomic force microscope 100 shown in FIG. 1, the probe chip 113 of the probe 110 is used for handling the probe 110 and mounting the probe 110 in the microscope 100. The tip 111 is used to sample the surface topography; as such, the spatial resolution of the topography imaging is limited by the diameter of the tip. The deflection of the cantilever portion 112 is proportional to the applied force and is measured by reflecting a laser beam emitted by a laser 120 off the cantilever portion 112 of the probe 110 into a quadrant photodetector 130. In the atomic force microscope 100, the tip/sample force controlling feedback loop is composed of the force modulating piezo tube actuator 160, the force measuring quadrant photodiode 130, and the processor 150. The piezo tube is composed of several piezoelectric crystals actuators that are used to control the position of the sample 140 with respect to the tip 111. In one example, tip remains fixed while the piezo tube is moved. Alternatively, the tip can be moved while the sample remains fixed. The quadrant photodiode 130 is composed of four photodetectors (131, 132, 133 and 134) and is used to monitor the deflection of the cantilever portion 112.

The deflection of the cantilever portion 112 is measured by the position of the laser spot in the quadrant photodetector 130, specifically the output of the top photodetectors (131+132) minus the output from the bottom photodetectors (133+134). Initially, with no force between the sample 140 surface and the tip 111, the deflection signal from the quadrant photodetector 130 is zero and as force is applied and the cantilever portion 112 deflects upward the deflection signal becomes a positive value. A single pixel of the image is obtained when the processor 150 moves the sample 140 via the piezo tube 160 towards the tip 111 such that the cantilever portion 112 reflects the laser spot in the quadrant photodiode 130 to a setpoint deflection value. The topographical pixel value is recorded as the distance the piezo tube moved to reach the setpoint. The setpoint, scan size, and number of pixels are entered by the user into the processor 150 prior to the scan. The scan size is the total area in the X and Y direction that the piezo tube 160 must move during the scan. The scan size and the number of pixels are used to determine the distance the piezo tube 160 must move in the X-Y direction between each pixel. All of the pixels are combined to create an image of the surface topography and output to the processor 150, which can include a feedback controller and user interface. One of ordinary skill in the art will understand that the above explanation of the atomic force microscope is just one example of the atomic force microscope and of the microscopy technique, and has been provided for background purposes only.

The most common form of atomic force microscopy is called "tapping mode" and is similar to that described above, except the probe 110 is vibrated at the cantilever resonance frequency and the monitored signal (proportional to force) is the root mean squared of the "normal" topographical signal previously described. Furthermore, one of ordinary skill in the art will understand that the lateral signal from the quadrant photodetector is composed of the left two photodetector (131, 133) signals minus the right two photodetector (132, 134) signals. The lateral signal is a measure of cantilever twisting and is typically not used in "tapping mode".

The scanning thermal microscopy technique allows for thermal measurements using thermal bimorph probes. This "thermal bimorph approach" is a simple and cheap technique for implementing scanning thermal microscopy, because it involves using the atomic force microscope quadrant photodiode 130 (shown in FIG. 1) for thermal transduction. This technique theoretically should provide a much better thermal resolution ($10^{-5}$ K, 2 orders of magnitude lower) than other known approaches.

The thermal bimorph probe is made from two intimately bound materials that have different thermal expansions. When the thermal bimorph probe is heated the difference in thermal expansion causes a bending stress in the material coating the probe 110. The bending stress is a significant drawback of the thermal bimorph approach, as explained below.

In one example, conventional topographical AFM probe may include a reflective layer provided on the cantilever portion to enhance the reflection of the laser. As explained below, the reflective layer has different thermal expansion properties than the material making up the cantilever portion of the probe, which results in the cantilever portion bending during the application of heat and is considered a nuisance to AFM topographical imaging.

FIGS. 2 and 3 illustrate the impact of heat on two types of conventional bimorph probes. FIG. 2 illustrates a so-called "diving board" probe 300. This probe 300 includes a body portion or probe chip 350, a cantilever portion 310 extending from the probe chip 350 and a tip 340 attached to the end of the cantilever portion 310. The cantilever portion 310 is made up of two different materials, a first material 320 (on top) and a second material 330 (on bottom). These two materials typically have different thermal expansion properties. Conventionally, however, the first material was selected to match the thermal expansion properties of the second material, in an attempt to avoid the drawbacks caused by the bend in the cantilever portion of the probe.

FIG. 3 illustrates another type of probe, referred to as a chevron shaped (V-shaped) probe 360. Probe 360 also includes a body portion or probe chip 390, a cantilever portion 370 extending from the body portion 390 and a tip 380 attached to the end of the cantilever portion 370. As in FIG. 2, the cantilever portion 370 of the probe 360 is made up of two materials, first material 375 (on top) and second material 385 (on bottom), that have different thermal expansion properties. The purpose of the probe tip in atomic force microscopy is to probe the "atomic forces" (which are essentially repulsion forces), while in thermal microscopy, a probe tip is used to sample a small area of the surface of the sample. As a result, the probe tip acts as a bottleneck for the movement of heat between the probe and the surface. Therefore, with optimum thermal sensitivity, the spatial resolution of a thermal image is limited by the size of the probe tip. Assuming very sensitive thermal sensing, the size of the tip impacts the resolution of the measurement.

As shown in FIGS. 2 and 3, when heat is applied to probes 300 and 360, the cantilever portions 310 and 370 bend in a "normal" bending manner. This thermal induced "normal" bending interferes with the ability to measure and the topographical signal, as explained with respect to FIG. 4 below, and is thus considered a nuisance to AFM topographical imaging. The heat that is applied to the probes can come from a laser, or from an external heater (or cooler) applied to the probe or to the surface.

FIG. 4 illustrates thermal and topographical signals of a conventional thermal "diving board" probe 300 in a thermal bimorph approach. The problem with using the conventional thermal bimorph probes, however, is that the thermal signal and the topographical signal utilize the same signal transduction channel in the quadrant photodiode 130, namely "normal" direction bending. That is, the topographical deflection signal 430 and thermal deflection signal 420 from the surface lead to the cantilever portion being deflected in the same direction (the top 2 photodiodes (A+B) minus the bottom 2 photodiodes (C+D)) in the quadrant photodiode 130, resulting in interference between the thermal signal and the topographical signal. As a result, the thermal bimorph effect is considered a nuisance, and a significant drawback of the thermal bimorph approach. While attempts have been made to circumvent the bending issue that results in overlapping thermal and topographical signals, previous solutions required complex and high-cost electronic structures and were not considered practically feasible.

Other probes using different thermal sensing mechanisms have also been investigated, including thermocouple probes, thermal-resistive based probes and others. However, with the exception of thermal-resistive based probes, these other approaches are not practically feasible due to high fabrication costs, poor performance or other reasons.

Thermal-resistive based probes involve monitoring the thermally induced changes in the electrical resistance of a circuit embedded in the thermal-resistive probe. Unfortunately, thermal-resistive based probes also have drawbacks. For example, the micro-fabrication process necessary to create either of these commercial thermal-resistive probes is quite expensive, resulting in an average cost of about $150-$300/probe, which is 5-10 times higher than the cost of non-specialized topographical atomic force probes.

While probe cost is the major hindrance to widespread use of the thermal-resistive probes, there are other issues with resistive based scanning thermal microscopy. For example, while these commercial thermal-resistive probes can have fairly good spatial resolution (~30 nanometers (nm)), the thermal resolution is far from optimum at ~0.1 degrees Kelvin (K). Furthermore, resistive based scanning thermal microscopy requires additional hardware which can also be quite expensive (well over $20,000) and is not commercially available for many scanning probe microscopes. Resistive and other electrical-based scanning thermal microscopy probes can also suffer from cross-talk between thermal and electrical signals when imaging electrical circuits. For at least these reasons, thermal-resistive probe have not achieved widespread success.

SUMMARY OF THE INVENTION

Examples of embodiments of the present invention described below may overcome the above disadvantages and other disadvantages not described above. However, the present invention is not required to overcome the disadvantages described above, and some embodiments of the present invention may not overcome any of the problems described above.

According to an aspect of the present invention, there is provided an atomic force microscope probe that includes a body portion and a cantilever portion. The cantilever portion of the probe extends from the body portion and ends in a tip portion. The tip portion of the probe may include a tip that extends away from the second surface. The cantilever portion of the probe has a first surface and a second surface opposite the first surface. The cantilever portion of the probe includes a first material arranged on a first portion of the first surface, the first material having a different thermal expansion than a material forming the cantilever portion. According to one aspect, the first material may be arranged over approximately half of the first surface, extending from the tip portion to the body portion. According to another aspect, the first material may be a plasma polymerized film or a polymeric photoresist film.

According to one aspect of the present invention, the probe may take various shapes, including a "diving board" shape, or a chevron (V-shape). The V-shaped probes typically include a first leg and a second leg which are connected to form the V-shape. In this aspect, the first material may be arranged on the first surface of the first leg, while the second material may be arranged on the second surface of the second leg.

According to another aspect, the cantilever portion of the probe may include a second material arranged on a first portion of the second surface, the second material having a different thermal expansion than the material forming the cantilever portion. According to this aspect, the first portion of the first surface and the first portion of the second surface are on opposite sides of a vertical plane that bisects the cantilever portion in a longitudinal direction, wherein the vertical plane is orthogonal to the first surface of the cantilever portion. Furthermore, as one example, the first portion of the second surface may cover approximately one half of the second surface and extends from the tip portion to the body portion.

According to other aspects of the present invention, the cantilever portion of the probe may include a first material non-uniformly or non-symmetrically distributed over the first surface of the cantilever portion. In one aspect, the first material may be non-uniformly distributed over the first surface of the cantilever portion such that the first material has a gradient in a lateral direction of the cantilever portion. In another aspect, the cantilever portion further includes a second material non-uniformly distributed over the second surface of the cantilever portion.

Other aspects of the invention include methods of making a probe used in an atomic force microscope. An example of such methods includes arranging a first material on a first surface of a cantilever portion of the probe, where the first material has a different thermal expansion than a material forming the cantilever portion and removing a portion of the first material from the first surface of the cantilever portion of the probe. According to one aspect of the present invention, removing the portion of the first material from the first surface exposes the first surface of the cantilever portion where the first material is removed.

According to another aspect of the present invention the method of making a probe used in an atomic force microscope, may also include arranging a second material on a second surface of the cantilever portion of the probe, the second surface being opposite to the first surface, and removing a portion of the second material from the second surface of the cantilever portion of the probe. In accordance with this method, the first material and the second material may be arranged on opposite sides of a vertical plane that bisects the cantilever portion in a longitudinal direction, wherein the vertical plane is orthogonal to the first surface of the cantilever portion.

In accordance with other aspects of the present invention, there is provided a system which images a surface of a sample, the system including an atomic force microscope probe, a laser that emits a laser beam onto the atomic force microscope probe, a photo-detector that receives the laser beam reflected from the atomic force microscope probe, an actuator that accommodates the sample; and a processor operably connected to the actuator and to the photo-detector, wherein the processor controls the movement of the actuator. The probes used in the system are probes that include the structure described below.

BRIEF DESCRIPTION OF THE DRAWINGS

The above and/or other aspects of the present invention will become more apparent by describing in detail examples of embodiments thereof with reference to the attached drawings in which:

FIG. 12A is a topographical slice plot taken from the data in the topographical AFM image shown in FIG. 12C. FIG. 12B is a topographical slice plot taken from the data in the thermal AFM image shown in FIG. 12D.

DETAILED DESCRIPTION

Figure 1:
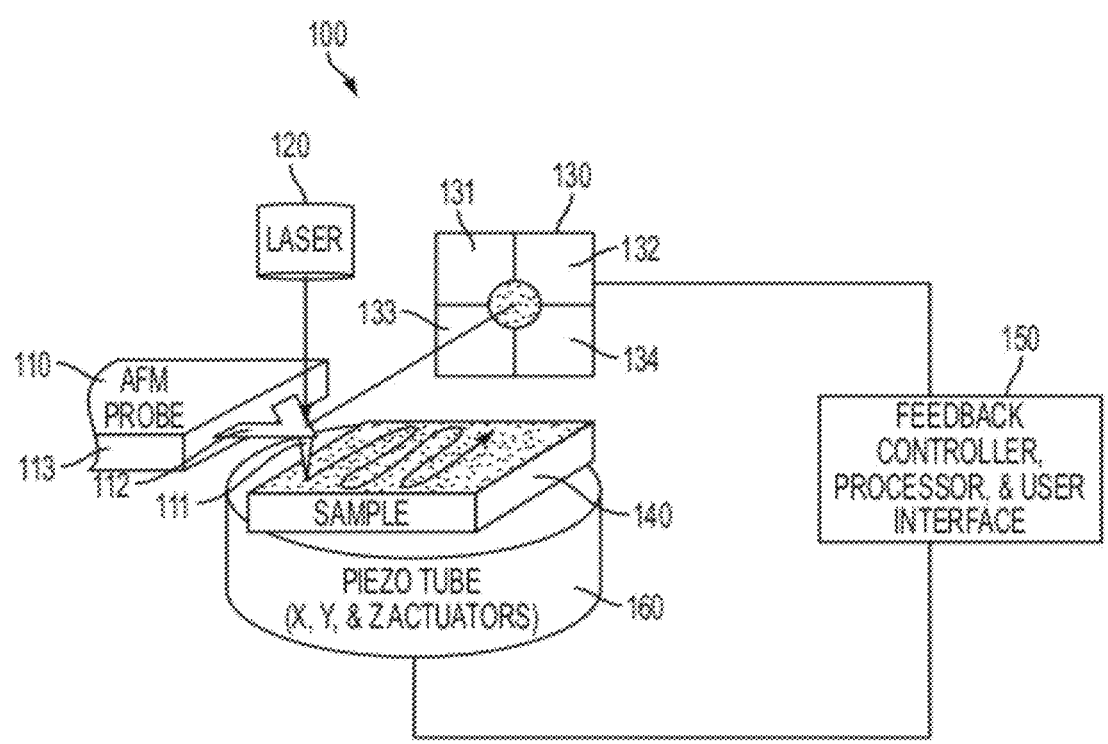
FIG. 1 illustrates the arrangement for a conventional atomic force microscope.

Hereinafter, various examples of embodiments of the present invention will be explained with reference to the attached drawings. Aspects of the invention may be embodied in various forms without being limited to the embodiments set forth herein. Descriptions of well-known parts are omitted for clarity, and like reference numerals refer to like elements throughout.

As described in detail below, embodiments of the present invention address the thermal/topographical signal interference issue by using a novel asymmetrical bimorph geometry that twists the cantilever portion of a thermal bimorph probe when heat is applied, thereby separating out the thermal signal into a different channel from the topographical signal. Embodiments of the present invention do not necessarily require complicated and expensive electronic equipment; instead the imaging techniques rely on hardware that can be provided by atomic force microscope manufacturers.

FIG. 5 illustrates the bending of a thermal bimorph "diving board" type probe that is manufactured in accordance with one embodiment of the present invention. The probe 500 includes a body portion 560, a cantilever portion 510 extending from the body portion 560 and a tip 550 attached to one end of the cantilever portion 510. The cantilever portion 510 is made up of at least two materials that have different thermal expansion properties. It should be noted that more than two materials may be used to achieve the effects described throughout this specification. For example, in one embodiment three different layers of materials may be arranged in order to cause the cantilever portion of the probe to "twist."

Typically, chevron-shaped and diving board-shaped probes are fabricated from silicon, silicon oxide, or silicon nitride, but other materials including other silicon-based inorganic materials are also possible. These materials are used for both the cantilever portion and the chip portion and are typically selected due to the ease and development of microfabrication procedures.

In the example above, silicon-based inorganic materials are used in the cantilever portion, and have linear thermal expansion coefficients on the order of $10^{-5}$/K to $10^{-6}$/K. The cantilever portion also includes a second material, which typically has very different thermal expansion properties and can adhere to the main cantilever material. Examples of the second material include various polymers, because polymers typically have thermal expansion coefficients on the order of $10^{-3}$/K to $10^{-5}$/K. In certain cases, polymers may even have negative thermal expansion coefficients or anisotropic thermal expansions.

Plasma-enhanced chemical vapor deposition is a highly promising polymer deposition technique for thermal bimorphs because the polymer films have excellent adhesion properties and very high absolute linear thermal expansion coefficients. Furthermore, polymers are very easy to pattern or process via lithography, ion milling, e-beam milling, laser ablation or other techniques. Due to the ease of processing, typical "photo-resist" polymeric materials capable of photolithographic patterning, such as SU-8 are also promising. These materials are easily patterned to create the twisting bimorph and can be deposited in a variety of methods including spin-coating, dip-coating, chemical vapor deposition and other techniques. Light is then used to pattern the polymer though a positive photoresist or negative photoresist process. Liquid crystalline polymers are also a good thermal film material due to the ability to tailor the thermal expansion coefficient in different directions.

The tip of cantilever portion can be made of various metals or inorganics ("hard materials") including, for example, silicon, silicon oxide, silicon nitride, diamond, tungsten, or other hard materials. Selection of the appropriate material for the tip includes review of at least the following properties: the elastic modulus, hardness, lack of wear, toughness, and ease of fabricating sharp tips.

Figure 5A:
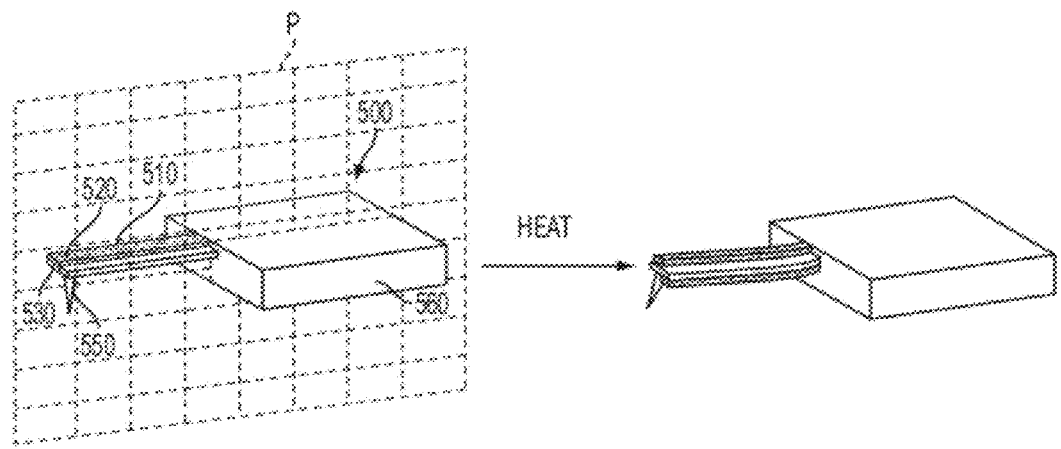
FIG. 5A illustrates the bending of a thermal bimorph "diving board" type probe that is manufactured in accordance with one embodiment of the present invention.
Figure 5B:
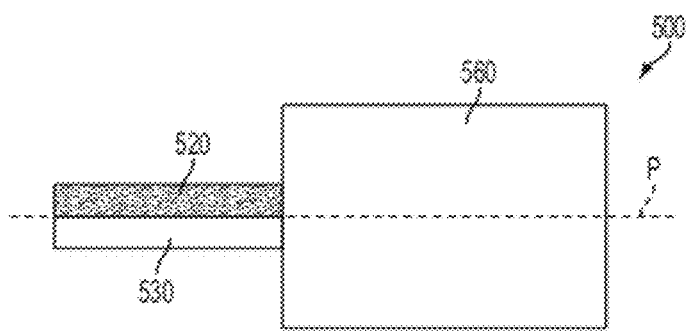
FIG. 5B is a top view of the thermal bimorph "diving board" type probe of FIG. 5A.

As shown in FIG. 5A, the first material 520 is provided along one side (e.g., the left side) of the top surface (made from the second material 530) of the cantilever portion 510, extending from the body portion 560 to the tip 550. In this example, the first material 520 (or a third material having appropriate thermal expansion properties) can also be provided on the bottom surface of the cantilever portion 510, on the opposite side (e.g., the right side) of a vertical plane (p). As illustrated in FIG. 5A, the first material 520 (or a third material) extends from the body portion 560 to the tip 550 along the cantilever portion 510. As also shown in FIGS. 5A and 5B, the vertical plane (P) bisects the cantilever portion 510 in a longitudinal direction, and is orthogonal to the top surface of the cantilever portion 510. However, it should be noted that similar effects may be achieved with alternative constructions, such as those described below.

As a result of the unique structure of the embodiment of the thermal bimorph probe illustrated in FIG. 5A, when the probe 500 is heated, the probe twists, instead of bending as in the conventional art. The twist of the probe 500 in the embodiment of FIG. 5A avoids the interference between the thermal signal and the topographical signal that occurs in the conventional art, allowing a user to obtain measurements of both the thermal and the topographical signals while maintaining high resolution.

Figure 6:
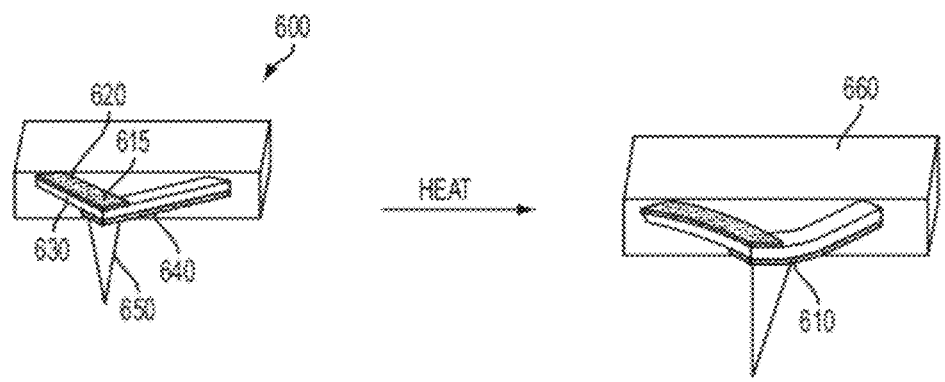
FIG. 6 illustrates the bending of a thermal bimorph chevron shaped probe that is manufactured in accordance with another embodiment of the present invention.

FIG. 6 illustrates the bending of a thermal bimorph chevron shaped probe that is manufactured in accordance with another embodiment of the present invention. The thermal bimorph chevron shaped probe 600 illustrated in FIG. 6 includes a body portion or chip 660 and a V-shaped cantilever portion 610 extending from the body portion 660. A tip 650 is located on the end of the cantilever portion 610 that is opposite the body portion 660. The tip 650 extends away from the bottom surface of the cantilever portion. The V-shaped cantilever portion 610 includes two legs (620, 640), and is made up of two materials that have different thermal expansion properties.

As shown in FIG. 6, the first material 615 is provided on at least a portion of the top surface of the first leg 620 (e.g., the left leg) of the V-shaped cantilever portion 610, stretching from the body portion 660 to the tip 650. The V-shaped cantilever portion 610 is made from a second material 630 which has different thermal expansion properties from the first material. The first material 615 (or a third material having appropriate thermal expansion properties) can also be provided on at least a portion of the bottom surface of the opposite leg, second leg 640 (e.g., the right leg), of the V-shaped cantilever portion 610, stretching from the body portion 660 to the tip 650. Alternative constructions may include coating the top surface of the first leg 620 with a material that has a positive thermal expansion coefficient, such as first material 615, and the top surface of the second leg 640 with a material that has a negative thermal expansion coefficient.

Alternative constructions may also include arranging the first (thermal film) material on the top (or bottom) of the surface of the cantilever portion of the probe in a non-uniform and/or non-symmetrical manner. For example, the first material may be arranged to cover the entire top (or bottom, or both) surface of a diving board type probe, but with a gradient in the lateral direction. Likewise, the first material may be arranged non-symmetrically over the top (or bottom, or both) surface of a diving board type probe, such that heating the probe causes the cantilever portion of the probe to twist. Another possible alternative construction includes arranging two bimorph cantilevers with opposite orientations to one another, where the cantilevers are joined on an edge. An example of this alternative construction includes joining two diving board cantilever arrangement (such as those in FIG. 2), where the two cantilever portions would be joined along the longitudinal edge (the long edge). These two cantilever portions would share a single tip and a single chip (body portion) and have an upside down orientation with respect to each other similar. The cross-section of this cantilever would be split into a quadrant with the diagonals materials being identical and adjacent materials being different. It should be understood that there are many different permutations of bimorph geometry that can induce a twisting motion without inducing a bending motion, including geometries with a 180 degree symmetry rotation axis along the axis from the chip to the tip portion of the cantilever portion. It should also be understood that additional materials, such as materials with negative thermal expansion coefficients, materials with locally varying thermal expansion coefficients and/or materials with anisotropic thermal expansion coefficients can be used to create alternative constructions that cause similar twisting in the cantilever portion of the thermal bimorph probe.

As a result of the unique structure of the embodiment of the thermal bimorph probe illustrated in FIG. 6, when the probe 600 is heated, the cantilever portion 610 of the probe 600 twists, instead of bending as in the conventional art. The twist illustrated in the embodiment of FIG. 6 avoids the interference between the thermal signal and the topographical signal that occurs in the conventional art, allowing measurements of both the thermal and the topographical signals to be obtained, while maintaining high resolution. One of ordinary skill in the art will understand that the direction of the "twist" is based on the structural arrangement of the materials, and the either direction of the "twist" will achieve the same benefits or advantages.

It should be noted that embodiments of the invention are not limited to the specific structures illustrated in FIGS. 5 and 6, but may include additional or alternative structures within the scope of the present invention.

In accordance with one example of a method of using the thermal bimorph probe manufactured according to an embodiment of the present invention, the thermal bimorph probe is arranged in a probe holder, and a laser spot created by the laser is aligned on the cantilever of the thermal bimorph probe. Thereafter, the microscope is allowed to thermally equilibrate and the laser spot is centered in the quadrant photodetector 130. The resonant frequency of the cantilever is tuned and the sample is mounted on the actuator. Once the sample is mounted on the actuator, the tip of the probe is brought near the surface of the sample and parameters, i.e., force setpoint, control parameters, scan number, pixel number, etc., of the atomic force microscope are set. After the parameters of the atomic force microscope have been set, the thermal bimorph probe is engaged on the surface of the sample. Thereafter, the topographical and the thermal image of the surface of the sample are obtained. Upon completion of the imaging, the thermal bimorph probe is disengaged from the surface of the sample.

Embodiments of the present invention utilize a novel asymmetrical bimorph geometry that induces a twisting motion in the thermal bimorph probe. This twisting motion allows the thermal signal to be isolated from the normal deflection caused by surface topography, and thus facilitates nanoscale spatial resolution and mK thermal resolution and allows for mapping of nanoscale thermal properties of complex devices.

Figure 7:
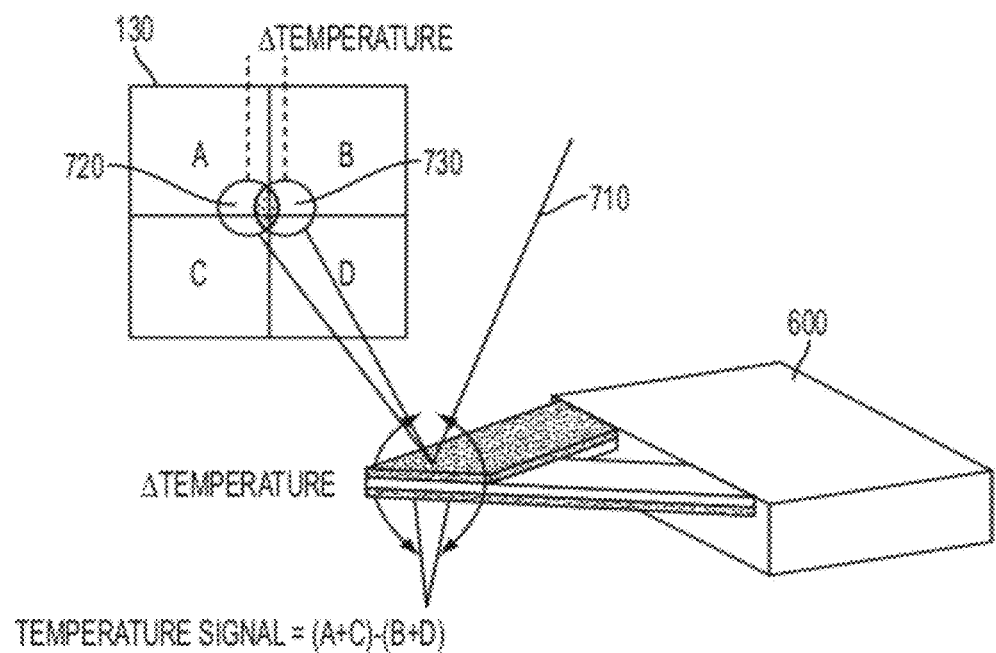
FIG. 7 illustrates the topographical and thermal signals generated by deflecting a laser beam off the surface of a thermal bimorph probe that is manufactured in accordance with one embodiment of the present invention.

FIG. 7 illustrates the topographical and thermal signals generated by deflecting a laser beam 710 off the surface of a thermal bimorph probe 600 that is manufactured in accordance with one embodiment of the present invention. As shown in FIG. 7, the laser beam 710 is deflected from a surface of the thermal resistive bimorph probe 600 onto different quadrants of a photo-detector 130. Because the probe 600 is formed with the above-described asymmetrical bimorph geometry, the cantilever portion 610 twists when heated, thereby generating a lateral deflection signal 720 ((A+C)−(B+D)) for thermal imaging, while maintaining the normal deflection signal 730 ((A+B)−(C+D)) for topographical imaging. Deflecting the laser beam 710 onto different quadrants of the photo-detector 130 avoids interference between the thermal signal and the topographical signal that is found in conventional systems, because the thermal signal is separated into a different channel from the topographical signal.

Scanning thermal microscopy in accordance with embodiments of the present invention significantly simplifies thermal imaging without compromising spatial or thermal resolution. Moreover, probes manufactured in accordance with embodiments of the present invention work well at near room temperature, making these probes highly promising for biological imaging applications, mapping of electric microdevices, and electromechanical systems. Moreover, these probes do not use electronics for signal transduction and therefore do not suffer from the same current leakage issues as other methods, making these probes ideal to study thermal and electronic transport simultaneously.

As will be described below, probes manufactured in accordance with the present invention are amenable to mass-production, cheap to manufacture, and are highly sensitive.

Figure 8:
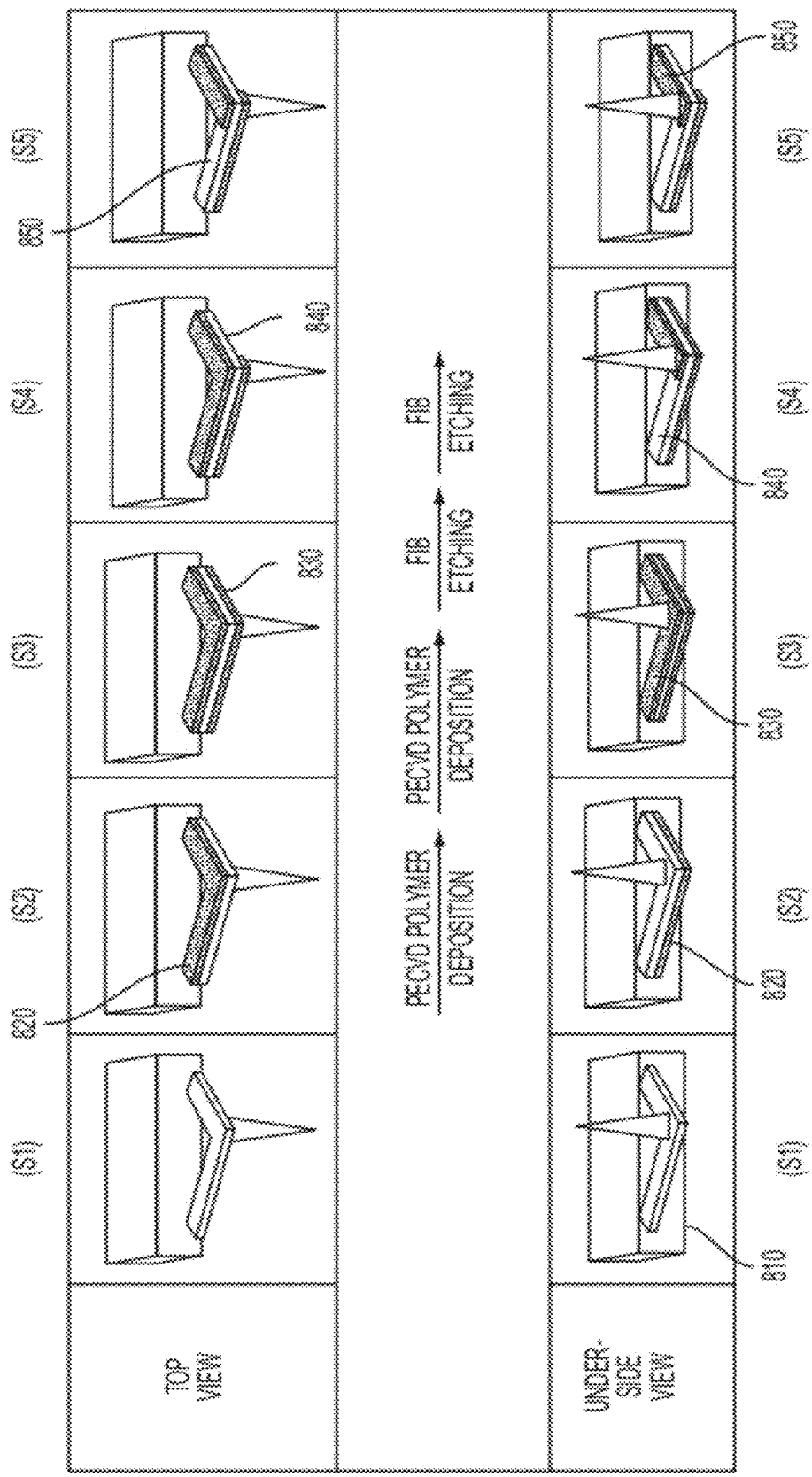
FIG. 8 illustrates a method of manufacturing a thermal bimorph probe according to one embodiment of the invention.

FIG. 8 illustrates a method of manufacturing a thermal bimorph probe according to one embodiment of the invention. And, FIG. 9 is a flowchart illustrating a method of manufacturing a thermal bimorph probe as shown in FIG. 8.

Figure 9:
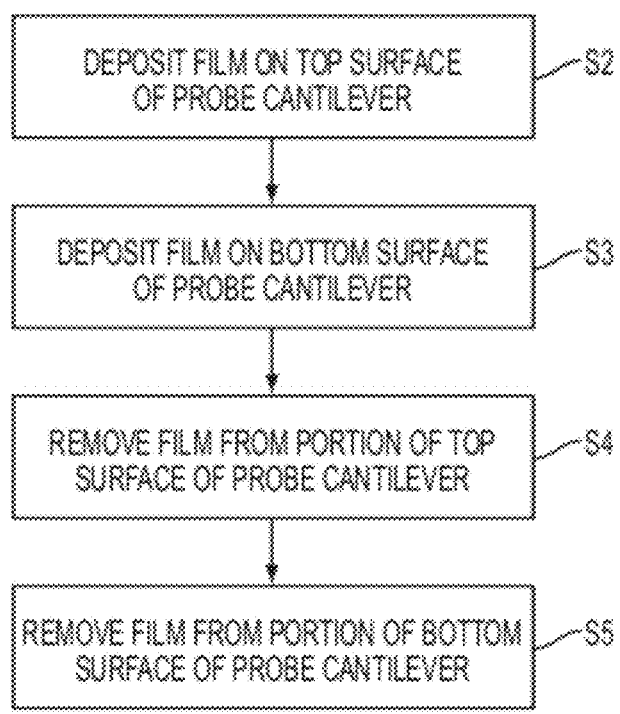
FIG. 9 is a flowchart illustrating a method of manufacturing a thermal bimorph probe according to one embodiment of the invention.

With reference to FIGS. 8 and 9, the manufacturing process begins (S1) with a plasma polymer-silicon bimorph chevron probe having a V-shaped cantilever portion 810. In one embodiment, the cantilever portion 810 is made from silicon. In operation (S2), a plasma polymerized film is deposited on the top surface 820 of the cantilever portion 810 of the V-shaped probe using plasma enhanced chemical vapor deposition (PECVD) techniques. Next, in operation (S3), the same plasma polymerized film as in (S2) is deposited on a bottom surface 830 of the cantilever portion 810, opposite to the first surface 820. In one embodiment of the present invention, the plasma polymerized film is an acrylonitrile monomer, and the nominal film thickness is in a range between 30 nm and 300 nm and preferably in a range between 70 nm and 110 nm. For example, in one embodiment the nominal film thickness is 90 nm. However, the film thickness can range anywhere from 5 nm and 50 micrometers (μm). The film may be deposited by any appropriate technique, including, for example, spin coating, dip coating, or by chemical vapor deposition.

In operation (S4), the plasma polymerized film is removed from the bottom surface of one leg 840 (e.g., the right leg) of the V-shaped cantilever portion 810 of the thermal bimorph probe. In operation (S5), the plasma polymerized film is removed from the top surface of the other leg 850 (in this example the left leg) of the V-shaped cantilever portion 810 of the thermal bimorph probe. In one embodiment, the plasma polymerized film may be removed by focused ion beam (FIB) etching or plasma etching, although the invention is not limited thereto. In other embodiments, film can also be removed with electron beam milling, laser ablation, or with photolithographic patterning and subsequent washing. It is also possible to mask off the regions with a hard mask before the material is deposited, so that the film is only deposited in regions that are not masked with the hard mask.

Figure 2:
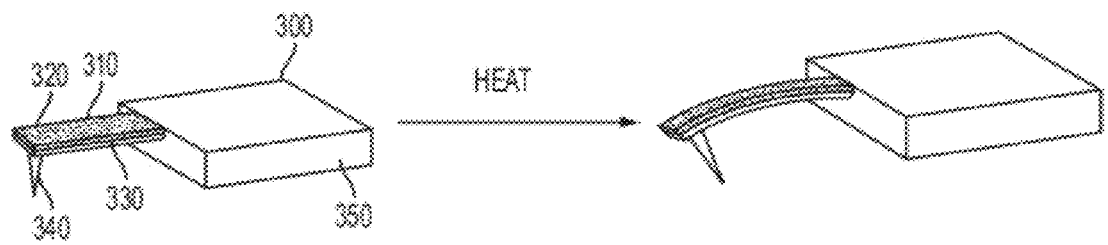
FIG. 2 illustrates a conventional "diving board" type thermal bimorph probe, and the normal bending of this probe when heat is applied.
Figure 3:
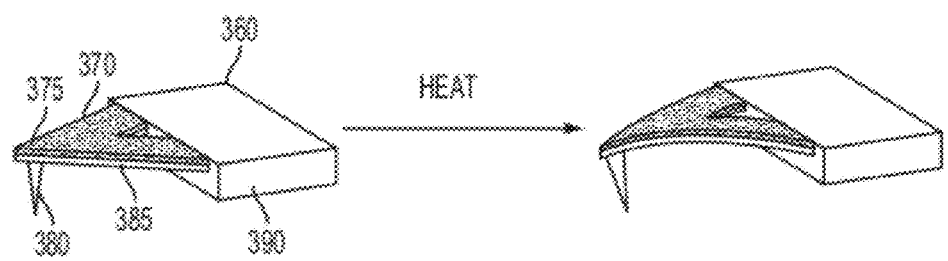
FIG. 3 illustrates a conventional "chevron shaped" type thermal bimorph probe, and the normal bending of this probe when heat is applied.

The result is that each leg (840 and 850) of the V-shaped cantilever portion 810 is a thermal bimorph, but with opposite orientations. The combined thermal actuation of the thermal bimorph probe is a twisting motion, as illustrated in FIGS. 5 and 6, instead of the bending, as illustrated in FIGS. 2 and 3.

As one of ordinary skill in the art will understand, the lateral (twisting) spring constants of cantilevers are much higher than the normal spring constants. For example, V-shaped cantilevers have lateral (twisting) spring constants that are roughly 500 times more stiff than normal bending spring constants. Therefore, in accordance with one embodiment of the present invention, the thermal expansion mismatch between the materials can be maximized in order to overcome the inherent high lateral stiffness. As one example, polymer/ceramic composites can provide a thermal expansion mismatch due to the polymer's high thermal expansion coefficient. It should be noted that the amount of "twist" may be controlled by appropriately selecting the materials that will make up the bimorph probe.

It should be noted that the methods described in FIGS. 8 and 9 are examples only, and methods of making probes in accordance with embodiments of the invention are not limited to FIGS. 8 and 9. Instead, as one of ordinary skill in the art will appreciate, the bimorph probes in accordance with embodiments of the present invention may be fabricated in various other ways.

For example, with respect to V-shaped probes, only one leg 840 of the of the V-shaped cantilever portion 810 can be coated with the plasma polymerized film, whereas the other leg 850 of the V-shaped cantilever portion 810 does not need to be coated. As another example, only a portion of each leg of the V-shaped cantilever portion 810 may need to be coated. The same principle applies to the diving board probe 500. For example, the plasma polymerized film may be deposited only on the left (or right) half of the top surface of the cantilever portion 510, extending from the body portion 560 to the tip 550. In this example, the bottom surface would not be coated with plasma polymerized film at all. Likewise, in the diving board or V-shaped probes examples, it is not critical for the plasma polymerized film to be deposited along the entire length of the cantilever portion (for example from the body portion 560 to the tip 550). That is, the material may be arranged along only a portion of the surface, around the area of the tip. The key is to arrange the materials in a way that achieves the "twist" effect. One of ordinary skill in the art will understand that coating of the upper and lower surfaces of the diving board probe 500 and the coating of the legs of the V-shaped chevron board probe 600 is not limited to the patterns discussed above, but many other coating patterns could be formed on the probes as long as such patterns cause the probes to twist instead of bending.

Figure 10A:
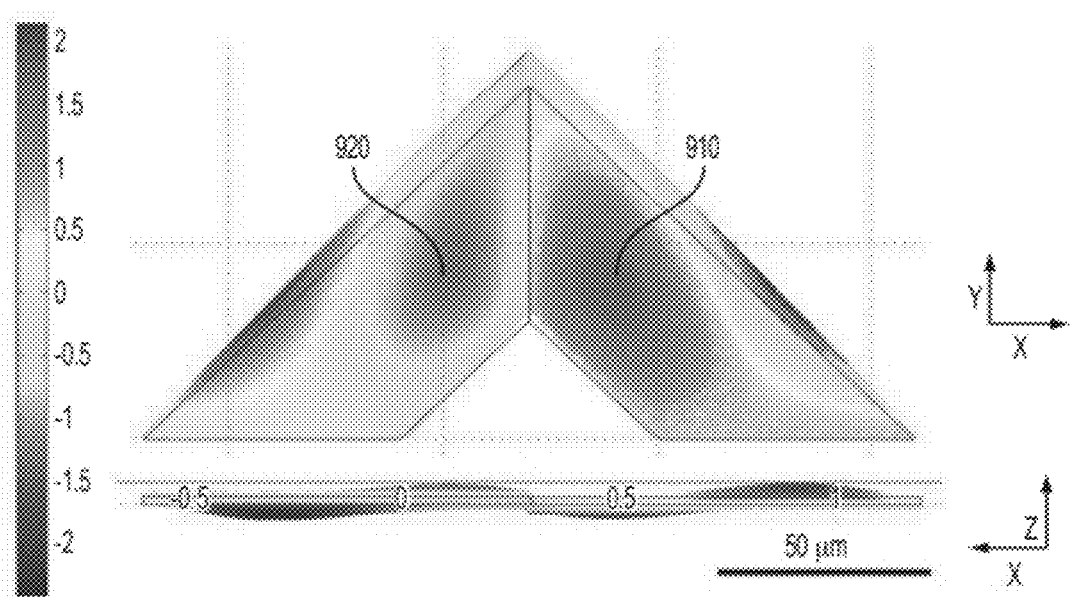
FIGS. 10A and 10B illustrate the results of comsol multiphysics models for a diving board type probe and a chevron type probe where the color of the thermal bimorph probe manufactured in accordance with one embodiment of the present invention indicates strain on the various sections of the probe.
Figure 10B:
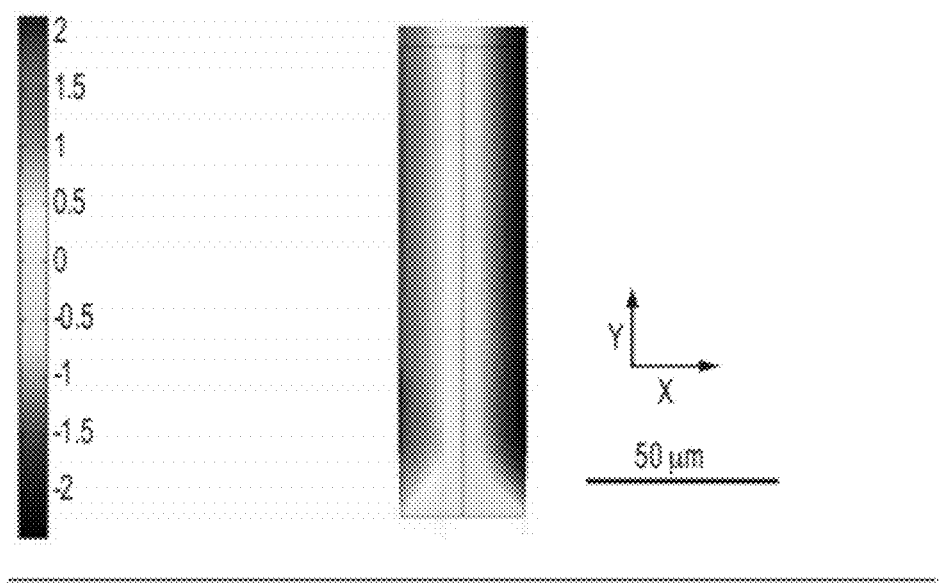

FIGS. 10A and 10B illustrate the results of a comsol multiphysics model where the color of the probe indicates Z-axis displacement of the probe surface on the various sections of a probe that was manufactured in accordance with one embodiment of the present invention. FIG. 10A top and 10B are top views of the output of thermal modeling of a chevron tip, similar to FIG. 6, and a diving board tip, similar to FIG. 5, respectively. The bottom part of FIG. 10A is side-view with the chevron pointing out of the page. In this side-view the color can be correlated with the z-displacement. The difference in color (light to dark) quantifies changes in displacement in the z-axis resulting from heating the modeled twisting bimorph probe, 3K from 300K to 303K. The distance units for both the x and y axis are noted in the scale bar beneath the probe. In a typical normal bending bimorph, the color of the probe in the modeling would be uniform across x-axis and would transition from light (no z-strain) to dark (positive/negative z-strain) from the base to the point of the chevron along the y-axis.

The comsol multiphysics model was used to determine the deformation of the twisting bimorph probe (e.g., probe 600) and the sensitivity dependence on the position of the laser beam 710 with respect to the surface of the cantilever portion of the thermal bimorph probe, such as thermal bimorph probe 600. FIG. 10A is a top view of the chevron probe and illustrates the results of modeling the thermal response of the chevron twisting bimorph cantilever geometry, similar to that the shown in FIG. 6. The finite element analysis modeling of the chevron probe indicated that the cantilevers would provide the highest thermal lateral sensitivity when the laser spot was positioned near the center of the cantilever in the x-y plane, as illustrated in FIG. 10A. Furthermore, in the center region of the cantilever portion 610 of the bimorph probe 600 the thermal normal bending sensitivity would ideally be zero, thereby preventing interference with the topographical signal.

On either side (offset in the x-axis) of the center point of the chevron probe are saddle points 910 and 920 illustrated in FIG. 10A. The saddle points 910 and 920 are regions where the cantilever portion (e.g., portion 610 of probe 600) is parallel with the horizon and thus are completely insensitive to thermal signal. Adjacent via translation in the y-direction to these saddle points 910 and 920 are regions of enhanced normal bending sensitivity and thus increased interference with the topographical signal. Therefore, one of ordinary skill in the art would understand that the laser spot should be centered on the bimorph probe (e.g., probe 600) to maximize the thermal lateral sensitivity and minimize the thermal normal sensitivity.

FIG. 10B is a top view of a "diving board" type probe and illustrates the results of modeling the thermal response of the twisting bimorph cantilever geometry similar to that shown in FIG. 5. The diving board cantilever had no saddle points, nor any regions of significant thermal normal bending. Thus, one of ordinary skill in the art will understand that the laser position for the diving board probe is not as sensitive as that of the chevron probe.

Figure 11:
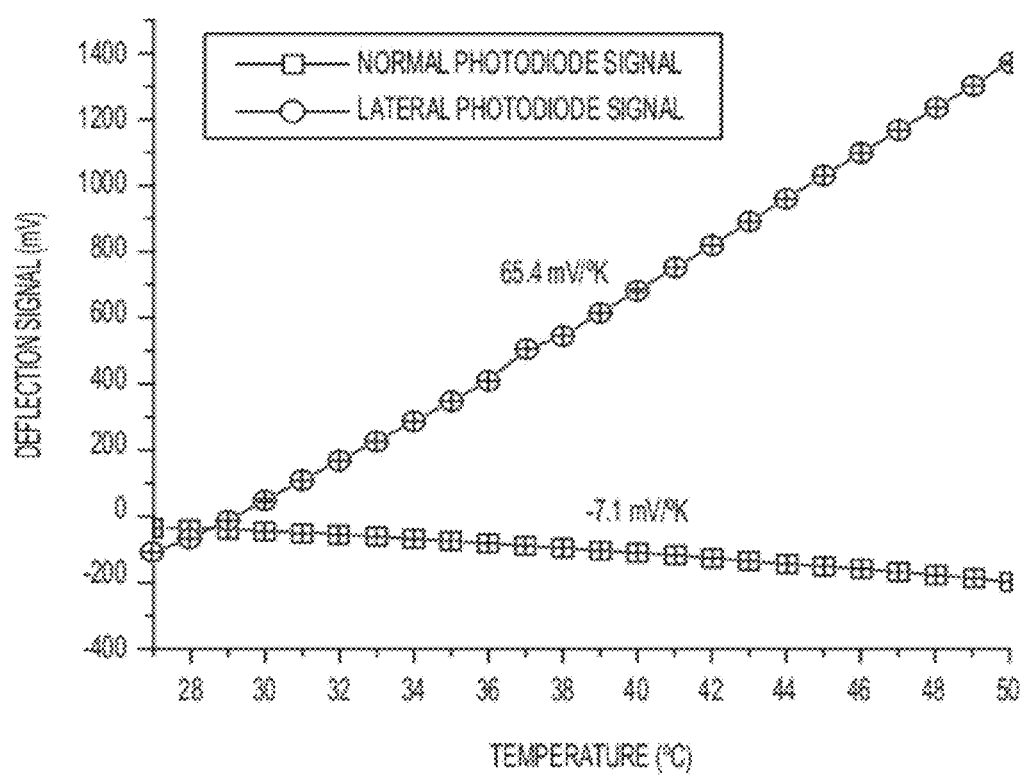
FIG. 11 illustrates a plot of lateral and normal photodiode signal versus temperature.

In another experiment, the thermal sensitivity of normal bending and lateral bending was quantified by suspending the cantilever of the bimorph probe above a thermal-electric cooler/heater, with a tip-surface distance of roughly 20 µm, as estimated by Z-stepper motor movement. The temperature was incrementally changed, while monitoring the normal and lateral photodiode signals. FIG. 11 shows a plot of lateral and normal photodiode signal versus temperature. The lateral thermal sensitivity was measured to be 65.4 millivolts per degree Kelvin (mV/K), whereas the absolute normal thermal sensitivity was measured to be 7.1 mV/K, almost an order of magnitude less than the lateral sensitivity. The lateral signal noise was measured to be 1.8 mV, thereby leading to a noise-limited thermal resolution of 27 mK. By contrast, the normal signal noise was measured to be 0.83 mV and a thermal resolution of 111 mK. Therefore it should be clear that the torsional bending was much higher than the normal bending. In addition, as will be explained with reference to FIGS. 12A-12D, the thermal bending of the probe does not interfere with imaging of the topography.

Figure 4:
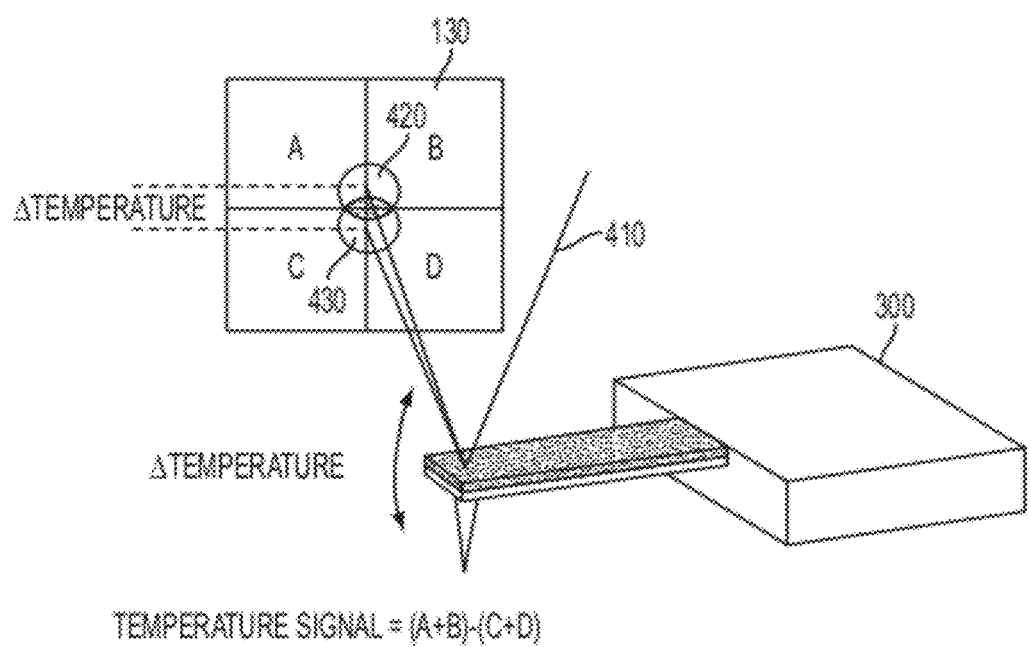
FIG. 4 illustrates the thermal and topographical signals generated by deflecting a laser beam off the surface of a conventional "diving board" type probe according to a thermal bimorph approach.

To prove that the lateral deflection signal is in fact measuring thermal properties, the temperature of the cantilever was changed from heating to cooling in the middle of an image, in order to see a contrast inversion in the lateral deflection. The vertical differential signal of the quadrant photodetector 130, illustrated in FIGS. 4 and 7, is used for monitoring and maintaining the tip sample force as well imaging the topography, while the horizontal differential signal of the quadrant photodetector 130 is used for monitoring the sample's local thermal conductivity.

With reference to the embodiments shown in FIGS. 5 and 6, it is illustrated that when the bimorph probes 500 and 600 are heated, the cantilever portions 510 and 610 will twist such that the laser spot moves towards the right half of the quadrant photodiode 130, while the laser spot will move toward the left half of the quadrant photodiode 130 when the sample is cooled. When the laser spot is centered in the photodetector 130 (at room temperature when the probe is at equilibrium) the lateral signal equals zero. When the surface of the sample is heated, the heat is transferred from the surface of the sample into the probe through the tip, resulting in a negative lateral signal (causing the laser spot to move right). When the surface of the sample is cooled, heat is transferred from the probe into the surface of the sample through the tip, resulting in a positive signal (causing the laser spot to move left). One of ordinary skill in the art will understand that if the opposite parts of the PECVD coating were removed then the cantilever would twist in opposite direction in response to thermal changes. Therefore, upon heating the lateral signal contrast will match the thermal conductivity, whereas an image of a cooled sample should have inverted contrast. As a result, this method of changing from sample heating to sample cooling serves as a strong "litmus test" to ensure that the lateral signal is derived from thermal properties of the sample.

The scanning thermal twisting microscopy imaging was performed with a tip-scanning atomic force microscope using a thermoelectric heater/cooler underneath the sample. Imaging is performed in "lift mode," which is a common method used in several scanning probe imaging techniques including magnetic force microscopy and electrostatic force microscopy. Lift mode is a raster scan technique that involves scanning each line two times before the next line is scanned. In scanning thermal twisting microscopy, the first line scan is used to obtain the topography in tapping mode atomic force microscopy, then during the second line scan the tip is lifted by a set amount and retraces the previous topography profile while obtaining the thermal lateral signal. Lift mode is used to maintain a constant tip surface distance and minimize lateral friction forces that interfere with the thermal signal. Various lift heights were used with a nominal lift height of 50 nm. As the temperature was raised the maximum stable lift height decreased. This behavior indicates that the predominant thermal conduction mechanism is a water bridge between the surface and the tip, which is typical of SThM performed at atmospheric conditions. Thermal images were not significantly affected by scanning speeds as high as 2 Hz with 512 points per line, indicating that the thermal equilibration time is on the order of milliseconds. Images were also obtained at different scanning angles to confirm that frictional forces were contributing to the thermal image.

To further demonstrate that the lateral deflection signal is in fact imaging thermal properties and the normal deflection signal is imaging topography independent of one another, the sample was changed from heating to cooling (with respect to room temperature) in the middle of an image. Here, contrast inversion in the lateral deflection image and no change in the topographical image were expected. The contrast inversion in the lateral deflection image is expected because the absolute magnitude of the image contrast is directly related to the thermal conductivity of the sample.

Specifically, as explained above, the lateral signal is comprised of the output from the left side of the photodetector 130 minus the output of the right side of the photodetector 130: ((A+C)−(B+D)). In one embodiment of the present invention, the cantilever portion of the probe twists to the left upon heating, creating a lighter image contrast. Thus in the sample heating regime, regions with higher thermal conductivity will appear lighter than regions with lower conductivity because the tip is being heated more in the higher thermal conductivity regions. Whereas in the sample cooling regime, regions with higher thermal conductivity will appear darker than regions with lower conductivity because more heat is being drawn from the tip in the higher thermal conductivity regions. Results obtained from a sample patterned with interference lithography are shown in FIGS. 12A-12D.

Figure 12A:
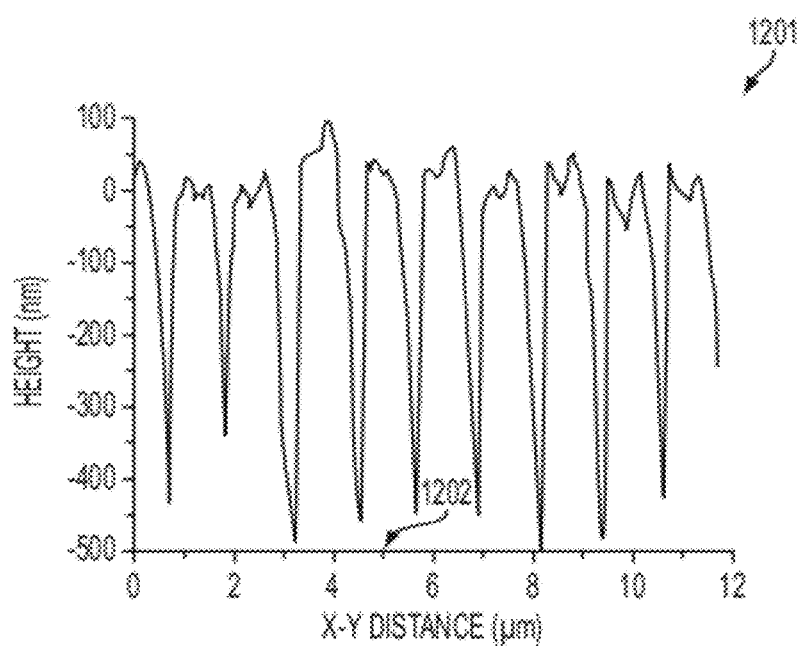
FIGS. 12A, 12B, 12C and 12D illustrate results taken from a sample patterned with interference lithography.
Figure 12B:
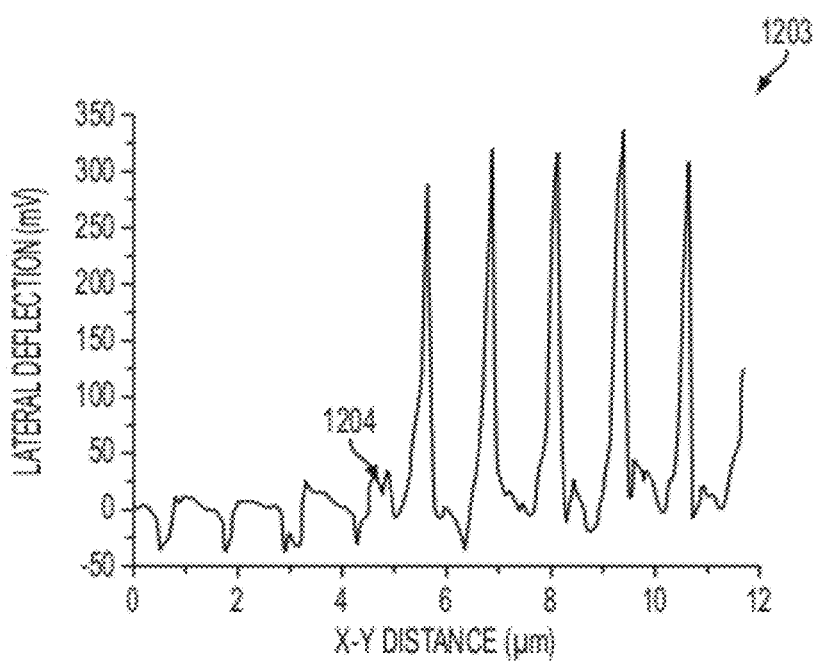

FIG. 12A shows a line slice of an AFM topographical image of the patterned sample obtained from the "normal" deflection photodiode signal. The slice plot data presented in FIG. 12A was taken along line 1201 in the topographical AFM image shown in FIG. 12C. FIG. 12B shows a line slice of the thermal twisting bimorph microscopy image obtained from the "lateral" deflection photodiode signal. The slice plot data presented in FIG. 12B was taken along line 1203 in the thermal image in FIG. 12D. The images from which the slice plots in FIGS. 12A and 12B were obtained were recorded concurrently and the slice plots are from the same regions of the respective topographical and thermal images. Half way through obtaining the images in FIGS. 12C and 12D, the sample was changed from heating to cooling. This point of change is noted in FIGS. 12A and 12B as 1202 and 1204, respectively, which were taken at the same time and from the same place on the sample.

Figure 12C:
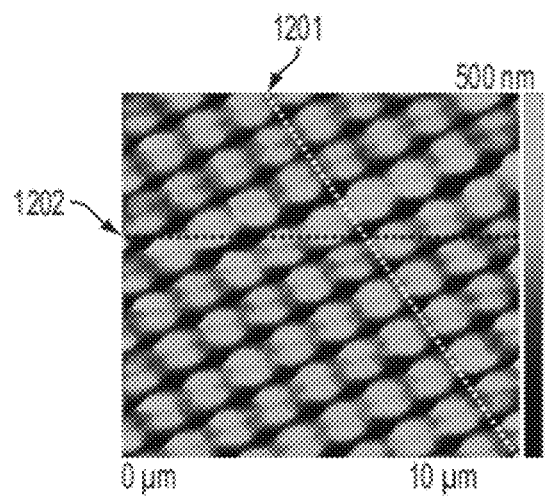
Figure 12D:
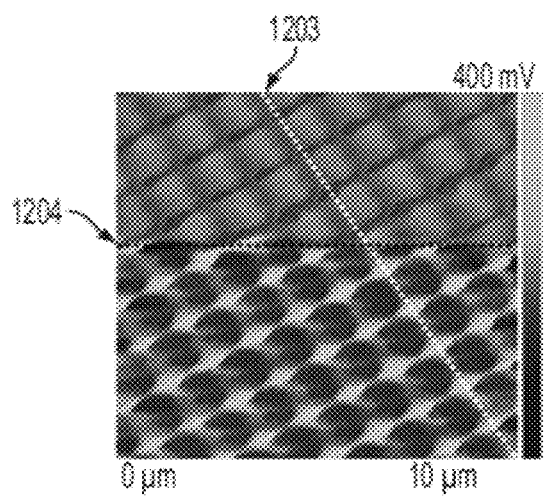

It is evident that the topographical height image (the "tapping" image from normal deflection) does not change upon changing from heating to cooling as illustrated in FIGS. 12A and 12C, whereas the lateral deflection image inverts the contrast upon the temperature change as illustrated in FIGS. 12B and 12D. This serves as evidence that thermal twisting microscopy is capable of imaging the thermal properties through a bimorph mechanism without significantly interfering with the topographical signal.

The spatial resolution of thermal microscopy was quantified with the following equation:

$$\Delta x = \frac{\Delta T_n}{(dT_t/dx)_{max}}$$

where $\Delta T_n$ is the noise of the temperature signal and $(dT_t/dx)_{max}$ is defined as the largest temperature gradient signal measured. Scanning thermal twisting microscopy images of interference lithography samples show a max thermal signal gradient of 2976.6 mV/μm and noise of 1.8 mV leading to a spatial resolution of 0.61 nm, which are about two orders of magnitude better than that of conventional SThM. Therefore, the thermal microscopy spatial resolution is limited by the radius of the curvature of the tip (which can be as low as 1 nm for nanofabricated tips and not by the thermal sensitivity of the cantilever.

While the present invention has been particularly shown and described with reference to exemplary embodiments thereof, it will be understood by those of ordinary skill in the art that various changes in form and details may be made therein without departing from the spirit and scope of the present invention as defined by the following claims, and their equivalents.

What is claimed is:

1. An atomic force microscope probe comprising:
   a body portion; and
   a cantilever portion extending from the body portion and ending in a tip portion, the cantilever portion comprising a first surface and a second surface opposite the first surface;
   the cantilever portion further comprising a first material arranged on a first portion of the first surface, wherein the first material has a different thermal expansion than a material forming the cantilever portion.

2. The probe of claim 1, wherein the first portion of the first surface covers approximately one half of the first surface and extends from the tip portion to the body portion.

3. The probe of claim 1, wherein the tip portion comprises a tip that extends away from the second surface and ends in a hemispherical point.

4. The probe of claim 3, wherein the hemispherical point of the tip is between 1 and 100 nanometers in radius.

5. The probe of claim 3, wherein a surface of the tip portion is not coated with the first material.

6. The probe of claim 1, the cantilever portion further comprising a second material arranged on a first portion of the second surface, wherein the second material has a different thermal expansion than the material forming the cantilever portion.

7. The probe of claim 6, wherein the first portion of the first surface and the first portion of the second surface are on opposite sides of a vertical plane that bisects the cantilever portion in a longitudinal direction, wherein the vertical plane is orthogonal to the first surface of the cantilever portion.

8. The probe of claim 6, wherein the first portion of the second surface covers approximately one half of the second surface and extends from the tip portion to the body portion.

9. The probe of claim 1, wherein the first material is a plasma polymerized film.

10. The probe of claim 6, wherein the second material has the same chemical composition as the first material.

11. The probe of claim 6, wherein the first material and the second material each have a thickness between 70 and 110 nanometers.

12. The probe of claim 6, wherein the cantilever portion is V-shaped and comprises a first leg and a second leg which are connected to form the V-shape.

13. The probe of claim 12, wherein the first material is arranged on the first surface of the first leg.

14. The probe of claim 12, wherein the second material is arranged on the second surface of the second leg.

15. An atomic force microscope probe comprising:
a body portion; and
a cantilever portion extending from the body portion and ending in a tip portion;
the cantilever portion further comprising a means for mechanically separating a thermal signal from a topographical signal during scanning microscopy.

16. A method of making a probe used in an atomic force microscope, the method comprising:
arranging a first material on a first surface of a cantilever portion of the probe, the first material having a different thermal expansion than a material forming the cantilever portion; and
removing a portion of the first material from the first surface of the cantilever portion of the probe.

17. The method of claim 16, wherein removing the portion of the first material from the first surface exposes the first surface of the cantilever portion where the first material is removed.

18. The method of claim 16, wherein the first material arranged on the first surface covers approximately one half of the first surface and extends from the tip portion to the body portion.

19. The method of claim 16, further comprising:
arranging a second material on a second surface of the cantilever portion of the probe, the second surface being opposite to the first surface, and
removing a portion of the second material from the second surface of the cantilever portion of the probe.

20. The method of claim 19, wherein removing the portion of the second material from the second surface exposes the second surface of the cantilever portion where the second material is removed.

21. The method of claim 19, wherein the first material and the second material are on opposite sides of a vertical plane that bisects the cantilever portion in a longitudinal direction, wherein the vertical plane is orthogonal to the first surface of the cantilever portion.

22. The method of claim 19, wherein the second material arranged on the second surface covers approximately one half of the second surface and extends from the tip portion to the body portion.

23. The method of claim 16, wherein the first material is a plasma polymerized film.

24. The method of claim 19, wherein the second material has the same chemical composition as the first material.

25. The method of claim 19, wherein the first material and the second material each have a thickness between 70 and 110 nanometers.

26. The method of claim 16, wherein the first material is removed using focused ion beam milling.

27. The method of claim 19, wherein the cantilever portion is V-shaped and comprises a first leg and a second leg which are connected to form the V-shape.

28. The method of claim 27, wherein the first material is arranged on the first surface of the first leg.

29. The method of claim 27, wherein the second material is arranged on the second surface of the second leg.

30. A system which images a surface of a sample comprising:
an atomic force microscope probe;
a laser that emits a laser beam onto the atomic force microscope probe;
a photo-detector that receives the laser beam reflected from the atomic force microscope probe;
an actuator that accommodates the sample; and
a processor operably connected to the photo-detector and to at least one of the actuator and the atomic force microscope probe, wherein the processor controls the movement of the actuator and the atomic force microscope probe relative to each other,
wherein the atomic force microscope probe comprises:
a body portion; and
a cantilever portion extending from the body portion and ending in a tip portion, the cantilever portion comprising a first surface and a second surface opposite the first surface;
the cantilever portion further comprising a first material arranged on a first portion of the first surface, wherein the first material has a different thermal expansion than a material forming the cantilever portion.

31. The system of claim 30, wherein the first portion of the first surface covers approximately one half of the first surface and extends from the tip portion to the body portion.

32. The system of claim 30, wherein the tip portion comprises a tip that extends away from the second surface and ends in a hemispherical point.

33. The system of claim 32, wherein the hemispherical point of the tip is between 1 and 100 nanometers in radius.

34. The system of claim 30, the cantilever portion further comprising a second material arranged on a first portion of the second surface, wherein the second material has a different thermal expansion than the material forming the cantilever portion.

35. The system of claim 34, wherein the first portion of the first surface and the first portion of the second surface are on opposite sides of a vertical plane that bisects the cantilever portion in a longitudinal direction, wherein the vertical plane is orthogonal to the first surface of the cantilever portion.

36. The system of claim 34, wherein the first portion of the second surface covers approximately one half of the second surface and extends from the tip portion to the body portion.

37. The system of claim 30, wherein the first material is a plasma polymerized film.

38. The system of claim 34, wherein the second material has the same chemical composition as the first material.

39. The system of claim 34, wherein the first material and the second material each have a thickness between 70 and 110 nm.

40. The system of claim 34, wherein the cantilever portion is V-shaped and comprises a first leg and a second leg which are connected to form the V-shape.

41. The system of claim 40, wherein the first material is arranged on the first surface of the first leg.

42. The system of claim 40, wherein the second material is arranged on the second surface of the second leg.

43. An atomic force microscope probe comprising:
a body portion; and
a cantilever portion extending from the body portion and ending in a tip portion, the cantilever portion comprising a first surface and a second surface opposite the first surface;
the cantilever portion further comprising a first material non-uniformly distributed over the first surface of the cantilever portion, wherein the first material has a different thermal expansion than a material forming the cantilever portion.

44. The probe of claim 43, wherein the first material is distributed over the first surface of the cantilever portion such that the first material has a gradient in a lateral direction of the cantilever portion.

45. The probe of claim 43, the cantilever portion further comprising a second material non-uniformly distributed over the second surface of the cantilever portion, wherein the second material has a different thermal expansion than the material forming the cantilever portion.

46. The probe of claim 45, wherein the second material is distributed over the second surface of the cantilever portion such that the second material has a gradient in a lateral direction of the cantilever portion opposite to the direction of the gradient of the first material.

47. An atomic force microscope probe comprising:
a body portion; and
a cantilever portion extending from the body portion and ending in a tip portion, the cantilever portion comprising a first surface and a second surface opposite the first surface;
the cantilever portion further comprising a first material non-symmetrically distributed over the first surface of the cantilever portion, wherein the first material has a different thermal expansion than a material forming the cantilever portion.

48. The probe of claim 47, the cantilever portion further comprising a second material non-symmetrically distributed over the second surface of the cantilever portion, wherein the second material has a different thermal expansion than the material forming the cantilever portion.

49. An atomic force microscope probe comprising:
a body portion; and
a cantilever portion extending from the body portion and ending in a tip portion, the cantilever portion comprising a first surface and a second surface opposite the first surface;
the cantilever portion further comprising a first material arranged on the first surface such that the cantilever portion twists about a center axis of the cantilever portion when the cantilever portion is heated, wherein the first material has a different thermal expansion than a material forming the cantilever portion.

* * * * *